(12) United States Patent
Grinberg (10) Patent No.: US 11,263,884 B2
(45) Date of Patent: Mar. 1, 2022

(54) EARLY WARNING FORECASTING LIFE-THREATENING TEMPERATURE METHOD AND SYSTEM

(71) Applicant: Boris Grinberg, Redwood City, CA (US)

(72) Inventor: Boris Grinberg, Redwood City, CA (US)

(*) Notice: Subject to any disclaimer, the term of this patent is extended or adjusted under 35 U.S.C. 154(b) by 0 days.

(21) Appl. No.: 16/529,797

(22) Filed: Aug. 2, 2019

(65) Prior Publication Data
US 2021/0035426 A1 Feb. 4, 2021

(51) Int. Cl.
G08B 21/02 (2006.01)
B60H 1/00 (2006.01)
G08B 21/18 (2006.01)
H04W 4/14 (2009.01)

(52) U.S. Cl.
CPC ......... G08B 21/02 (2013.01); B60H 1/00742 (2013.01); B60H 1/00778 (2013.01); B60H 1/00985 (2013.01); G08B 21/182 (2013.01); H04W 4/14 (2013.01)

(58) Field of Classification Search
CPC .... G08B 21/00; G08B 21/02; G08B 21/0202; G08B 21/0205; G08B 21/0213; G08B 21/0222; G08B 21/0225; G08B 21/023; G08B 21/0236; G08B 21/182; G08B 21/22; G08B 21/24; G08B 29/186; B60H 1/00985; B60H 1/00742; B60H 1/00778; B60H 1/00978; H04W 4/14; H04W 4/38; H04W 4/40; H04W 4/90
See application file for complete search history.

(56) References Cited

U.S. PATENT DOCUMENTS

| 8,600,561 B1* | 12/2013 | Modi | G05D 23/1919 |
| | | | 700/276 |
| 9,227,484 B1* | 1/2016 | Justice | B60H 1/00742 |
| 9,520,006 B1* | 12/2016 | Sankovsky | G06Q 10/20 |

(Continued)

OTHER PUBLICATIONS

Grundstein, Maximum vehicle cabin temperatures under different meteorological conditions, Mar. 2009 (Year: 2009).*

(Continued)

*Primary Examiner* — Brian Wilson
(74) *Attorney, Agent, or Firm* — Gregory M. MacDonald, Esq.

(57) ABSTRACT

The present invention comprises a system or method that collects data regarding the current and predicted weather in the proximity of a targeted vehicle and compares it with aspects of the targeted vehicle comprising the temperature in the passenger compartment, its geographical location, features, interior and exterior colors, size, whether its parked in a shaded area, etc. The system or method also comprises a regression function that may predict the time that a person, animal, or food product may remain in the vehicle in a safe condition. For example, under certain weather conditions, it may not be safe to keep a dog inside of a parked vehicle for more than four minutes. In addition, the system or method may collect and analyze additional factors based on previously collected data for the same vehicle models, and may comprise a prediction unit that may exchange information with other devices over communication protocols.

10 Claims, 8 Drawing Sheets

(56) References Cited

U.S. PATENT DOCUMENTS

| | | |
|---|---|---|
| 9,803,412 B1 | 10/2017 | Fontanini |
| 2007/0126561 A1 | 6/2007 | Breed |
| 2013/0109342 A1* | 5/2013 | Welch .................... G08B 21/22 |
| | | 455/404.2 |
| 2013/0144470 A1* | 6/2013 | Ricci .................. G06Q 30/0265 |
| | | 701/2 |
| 2013/0201013 A1* | 8/2013 | Schoenberg ......... B60N 2/2869 |
| | | 340/438 |
| 2015/0217754 A1* | 8/2015 | MacNeille .............. B60L 58/10 |
| | | 701/22 |
| 2017/0078400 A1 | 3/2017 | Binder |
| 2018/0126950 A1* | 5/2018 | Alderman ............... B60R 25/24 |

OTHER PUBLICATIONS

Youji Shimizu, A fuzzy logic analysis method for evaluating human sensitivities, 1995 (Year: 1995).*

Princeton, Fuzzy Inference Systems, Apr. 22, 2018 (Year: 2018).*

* cited by examiner

EARLY WARNING FORECASTING LIFE-THREATENING TEMPERATURE METHOD AND SYSTEM

CROSS-REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention relates generally to temperature monitoring. More specifically, the present invention relates to monitoring and preventing a certain temperature threshold to be reached in a vehicle.

2. Description of Related Art

In the prior art, temperature sensors are integrated into vehicles. This prevents the sensors from being used in more than one vehicle. Thus, each vehicle incurs the expense of having sensors installed. Therefore, there is a need for a device or system with sensors that can be easily moved between vehicles.

Some vehicles have embedded temperature sensors, which may be capable of measuring and displaying interior temperature when the vehicle's engine is turned on. However, when the vehicle's engine is turned off, this temperature monitoring ceases to operate. In some cases, a person may leave children, an occupant with limited mobility, a pet, food, etc. or another living being inside of a vehicle while shopping or performing other activities.

When the outside air temperature is 72 degrees Fahrenheit (° F.) the interior temperature in a parked vehicle may reach 120° F. after about 3.5 hours. When the outside air temperature is 96° F., the interior temperature in a parked vehicle may reach 120° F. after just 15 minutes. (See Inside Car Temperature Calculator (ICTC) https://goodcalculators-.com/inside-car-temperature-calculator/) Also, according to ICTC, scholars at the Stanford University School of Medicine performed a study in which they investigated the rate at which the interior temperature of a parked car increased during sunny days. (See: "Parked Cars Get Dangerously Hot, Even On Cool Days, Stanford Study Finds" https://med.stanford.edu/news/all-news/2005/07/parked-cars-get-dangerously-hot-even-on-cool-days-stanford-study-find-s.html. The study found that a parked vehicle's interior temperature rapidly increases when the sun is directly shining on the vehicle. The study also found that when a vehicle is parked in direct sunlight, the exterior color did not have a significant impact on the interior temperature, but the interior color may have an impact on the interior temperature, because darker internal surfaces absorb marginally more solar energy than light surfaces. In addition, the study found that a window opened a small amount had an insignificant effect on both the rate of heating and the final temperature after an hour. Furthermore, the study found that running an air conditioner prior to parking the car only delayed the temperature spike by about five minutes, which cannot be effective in preventing dangerous situations. The study concluded by indicating that other variables could be investigated, such as the shape and size of the vehicle's interior, or the effect of tinted windows.

Thus, in order to monitor the wellbeing of live organisms present inside a parked vehicle with the engine turned off, a system or method is needed to monitor the interior temperature that considers the interior and exterior colors of the vehicle, whether the vehicle is parked in direct sunlight or shade, and other factors that may affect a vehicle's interior temperature, such as the shape and size of the vehicle's interior, the effect of tinted windows, humidity, elevation, wind velocity, GPS coordinates, etc.

Moreover, existing warning systems that monitor for dangerous temperature conditions inside a vehicle rely on a threshold element, which is usually not triggered until the temperature reached a dangerous level inside the vehicle. Thus, this may not timely eliminate the danger, which may adversely affect food or more tragically cause injury or death to a person or animal. As a result, the prior art is limited in its effectiveness, because it does not takes into account additional parameters or conditions that may allow for predicting the occurrence of dangerous temperatures or timely notifying the owner, a rescuing service, or emergency personnel.

BRIEF SUMMARY OF THE INVENTION

It is a principal object to solve at least one of the disadvantages with other attempted solutions or to create other utility by providing a system or method to monitor the interior temperature of a vehicle, the interior and exterior colors of the vehicle, whether the vehicle is parked in direct sunlight or shade, the shape and size of the vehicle's interior, the effect of tinted windows, humidity, elevation, wind velocity, GPS coordinates, or other factors. The system or method may have a set of sensors, control and communication modules that can be used in vehicles of various configurations. The system or method may comprise an Early Warning Forecasting System that may be mobile or easily moved between vehicles. The system may comprise a specialized computer with specialized parts, including various sensors, means for monitoring these sensors, receiving data, storing the data values, evaluating the data values with at least one processor through a regression algorithm stored on a nontransitory computer readable medium, to evaluate the information, and communicate the results along with an electronic communications device that contains at least one processor (a.k.a. microprocessor or logic chip), a communication module, a collection of sensors, an informational display, and portable power supply, a cellar battery, another form of battery, or a connection to a source of electrical power.

In at least one embodiment of the present invention, the system contains the negative limitation that all processors used in the system are integrated into a mobile device that can be physically moved between vehicles, so that the processor integrated into the vehicle is not used in the system. In this way, the system of the present invention comprises an electronic communications device that can be easily moved between and adopted by different vehicles.

In at least one embodiment of the present invention, the device does not rely on any processors that are integrated into the vehicle, but instead relies only on one or more processors of its own that are integrated into a mobile device. The mobile device communicates with the at least one processor integrated into a smart phone or other electronic communications device, which may perform locally or remotely with any additional calculations and communicate the information with other devices.

Existing prior art is often based and dependent on Wi-Fi communication protocol. Other prior art is often dependent on a home network that is used to communicate to an internet provider through equipment such as a router, computer, and power outlets. The present invention, which is sometimes referred to herein as the Early Warning Forecasting System, comprises a system that may operate on any wireless data network including, but not limited to radio frequency (RF), infrared (IR), Global System for Mobile Communication (GSM) radio, 2G, 2.5G, 3G, 3.5G, 4G, 5G generation mobile networks, Third Generation Partnership Project (3GPP), 3GPP LTE (Long Term Evolution), 3GPP advanced LTE (Long Term Evolution Advanced), Enhanced Data rates for GSM Evolution (EDGE), Long Term Evolution (LTE), LTE advanced, General Packet Radio Services (GPRS), extended GPRS, Universal Mobile Telecommunications Service (UMTS), Code Division Multiple Access (CDMA), wideband CDMA (WCDMA), single-carrier CDMA, multi-carrier CDMA, CDMA 2000, Universal Mobile Telecommunications System (UMTS), IEEE 802, 802.11, Mobitex™, Personal Communication Systems (PCS), Time-Division Multiplexing (TDM), Time Division Multiple Access (TDMA), Extended TDMA (E-TDMA), Time Division-Code Division Multiple Access (TD-CDMA), Time Division-Synchronous Code Division Multiple Access (TD-SCDMA), all wireless communication standard WI-FI, Wi-Max, WiPro, Bluetooth®, global positioning system (GPS), Cellular Digital Packet Data (CDPD), frequency-division multiplexing (FDM), orthogonal FDM (OFDM), multi-carrier modulation, discrete multi-tone (DMT), Z-Wave, ZigBee™, ultra-wideband (UWB) radio communication technology, a wireless LAN radio communication technology, NFC wireless frequency, a Local network i.e. smart home network, a controller devices, cloud computing platform, cloud database, web APP and middleware, a wide area wireless network, a cloud computing system, and users' computing devices.

The system of the present invention is also fully autonomous, meaning that it can operate without the need for human control or intervention under a range of driving situations and conditions. The present invention, Early Warning Forecasting System, may be used to identify the presence of child, an occupant with limited mobility, a pet or another living being in a passenger compartment of the vehicle. The Early Warning Forecasting System evaluates data from at least one sensor at any given time if the system is not in sleep mode.

The present invention provides for determining the prediction of unsafe temperature through a system or method comprising fuzzy logic, which forms a regression function that measures the relationship between values of current weather, weather forecast, temperature in a passenger compartment of the vehicle, geographical location of the vehicle, interior and exterior features of the vehicle such as color, size etc. The regression function may predict the time when the vehicle is not in a safe condition. For example, under certain weather conditions, it may not be safe to keep a dog inside of a parked vehicle for more than four minutes. The regression function may consider GPS location, a vehicle's interior and exterior color, weather conditions, and whether the vehicle is parked in a shaded area as input parameters to predict how long it may be safe to keep an animal, such as a dog, inside of a vehicle. The Early Warning Forecasting System can collect and analyze additional factors based on previous experience and vehicle models. Also, the present invention can exchange information with other devices over communication protocols and adjust coefficients of the regression function over time.

The present invention is unique from the prior art in at least four ways: (1) it may analyze and predict dangerous situations before they occur through the use of a regression function, analysis, and an early warning system; (2) it is completely autonomous and effortlessly transferable from one vehicle to another; (3) the Early Warning Forecasting System may be used in a parked vehicle with the ignition off, (4) the Early Warning Forecasting System may consist of two unique modules: one module where the hardware and software components may be placed inside the passenger compartment of the vehicle, and a second module consisting of software only that may be installed on any smart phone, including, but not limited to, an iPhone, Android, BlackBerry or Windows phone, or a similar device.

The present invention may also use a weather forecast to estimate a vehicle's temperature. In addition, the present invention may take into account the geographical location of the vehicle to consider the effect of altitude, wind, and nearby bodies of water that may provide cooling. Furthermore, the present invention is detachable from a vehicle, so that it may be used in multiple vehicles, such as other vehicles owned by the user, rental vehicles, etc.

The present invention may remain in a sleep mode when the vehicle is moving to save energy and avoid unnecessary Short Message Service (SMS) data traffic. The present invention may be activated from its sleep mode with an accelerometer, motion sensor, temperature sensor or other instrument when the vehicle is parked. The GPS and SMS networks may work independently of the vehicle. The GSM radio may be used for communications between the device and a mobile phone. The present invention is autonomous and works autonomously by using its own rechargeable battery, solar battery, or other electrical power source, and its own functional algorithm of the Early Warning Forecasting System.

In at least one alternative embodiment, the device may be hung from a window of the vehicle, so there is an exterior solar panel on the outside that powers a solar battery integrated into the device to eliminate the need for having to either replace a disposable battery or to charge a rechargeable battery.

Other objects and advantages of the present invention will become apparent from the following detailed description when viewed in conjunction with the accompanying drawings, which set forth certain embodiments of the invention.

In at least one embodiment, the present invention may also monitor one or more of the following: carbon dioxide ("CO2"), carbon monoxide ("CO"), oxygen ("O2") levels, and interior temperature inside of the vehicle when the vehicle has been left with its ignition on, while parked. For example, if a person starts the engine of the vehicle while it is parked inside of a closed space, such as a garage, to warm up the vehicle's engine or interior or both, there is a risk that the CO or CO2 level may reach an unhealthy threshold. This may lead to asphyxiation or another condition that may adversely affect the health or well-being of humans or animals within the vehicle. If the Early Warning Forecasting System calculates that the CO or CO2 level may reach an unhealthy threshold, an electronic communications device will start sending a SMS with preconfigured time interval to the subscriber's phone number by a cellular communication or other wireless transmission.

In at least one embodiment of the present invention a GPS sensor could be used to determine when the vehicle is parked in a closed space or a garage. In this scenario, the system or method may be programmed to send a signal prior to the CO or CO2 levels increasing. A GPS sensor could be used to wait until the CO or CO2 levels increase to a percentage of a dangerous level before turning off the ignition to a vehicle when the GPS sensor determines that the vehicle is not parked in an enclosed space.

In at least one embodiment, if the temperature reaches a particular threshold, an additional action, such as the system transmitting a 911 or emergency telephone call, SMS, or text with a preprogrammed message and/or the vehicle's GPS coordinates may be sent to emergency respondents, subscriber's telephone number(s) specified in the configuration, and/or the telephone number(s) of another person(s).

In at least one other embodiment, the present invention may send a SMS from multiple instances of Early Warning Forecasting Systems located in one or multiple vehicles to a single or multiple subscriber's telephone number(s) specified in the configuration.

In at least one alternative embodiment, the Early Warning Forecasting System may send a SMS to a subscriber's telephone number(s) specified in the configuration if either the CO or CO2 levels reach a predetermined percentage of an unsafe level in a short time frame. In at least one embodiment of the present invention, the system or method may be used to either turn off the vehicle's ignition or open a garage door, when either the CO or CO2 levels increase to a dangerous level or after a predetermined period of time.

BRIEF DESCRIPTION OF THE DRAWINGS

The accompanying drawings, which are incorporated in and constitute a part of this specification, illustrate several aspects described below.

DETAILED DESCRIPTION OF THE INVENTION

It is to be understood that this invention is not limited to any particular embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without some of these specific details. Thus, all illustrations of the drawings are for the purpose of describing versions of the present invention, and are not intended to limit the scope of the invention.

In the following section, the present invention is described fully by referencing the details in the enclosed drawings, which illustrate certain embodiments of the invention. The numbers shown in this specification refer to the corresponding numbers in the enclosed drawings. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements.

In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The present invention comprises a regression function that measures the relationship between the mean value of one variable and corresponding value of other variables. The regression function may predict the time when the vehicle is not in a safe condition. For example, under certain weather conditions, it may not be safe to keep a dog inside of a parked vehicle for more than four minutes. The regression function may consider a vehicle's GPS location, a vehicle's interior and exterior colors, weather conditions, and whether the vehicle is parked in a shaded area as input parameters to predict how long it may be safe to keep a dog inside of a vehicle.

Figure 1:
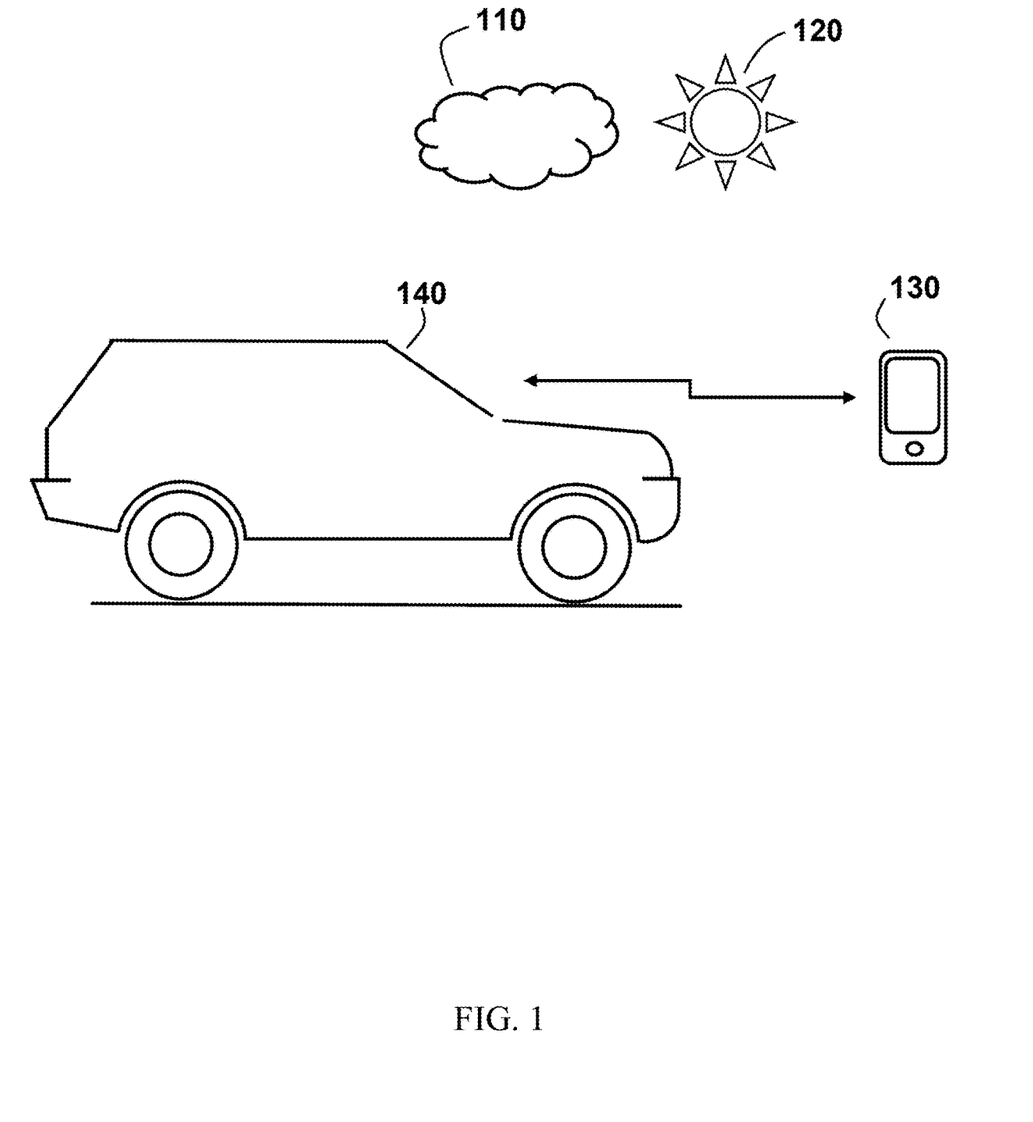
FIG. 1 is a drawing of a vehicle with multiple sensors that communicates with a remote device of the present invention in which at least one of the embodiments of the present invention is shown.

FIG. 1 is a drawing of a vehicle 140 with multiple sensors that communicates with a remote electronic communications device, such as a smart phone 130. The weather conditions considered by the system or method comprises a regression function, which may consider whether it is cloudy 110 or sunny 120 in the vicinity of the location of the vehicle 140.

Figure 2:
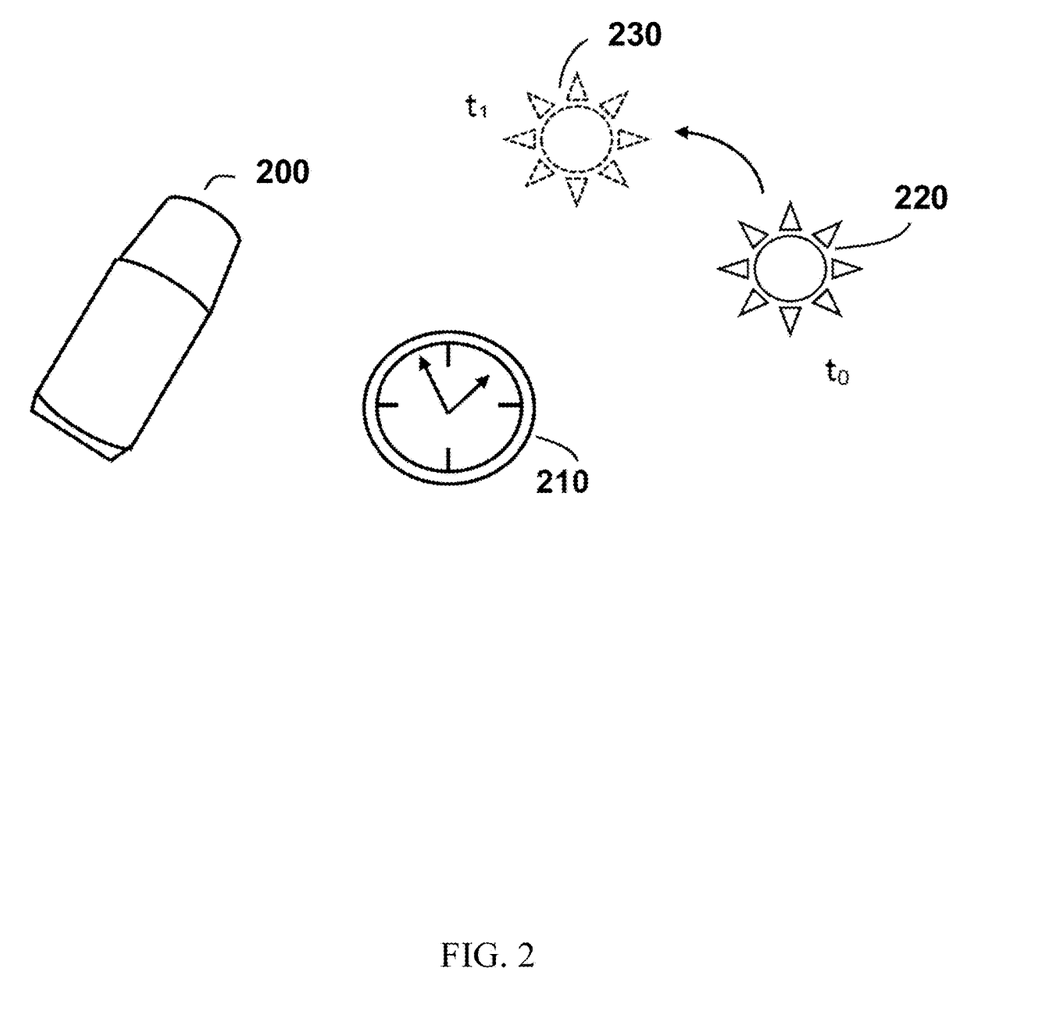
FIG. 2 is a drawing of a vehicle, the sun, and the timing factor of a regression model in which at least one of the embodiments of the present invention is shown.

FIG. 2 is a drawing of a vehicle 200, the initial position of the sun 220, a later position of the sun 230, and a timing factor 210 of a regression model of the system or method of the present invention in which at least one of the embodiments of the present invention is shown. The regression function may consider the position of the sun based on the time of the day. For example, the sun may generate less heat when it is lower in the sky in its initial position $T_0$ 220 and more heat when it is higher in the sky in a later position $T_1$ 230. Thus, the regression function may use a timing factor 210 to estimate the temperature in the vicinity of a vehicle 200 to determine the amount of time that a child, an occupant with limited mobility, a pet or another living being inside of the vehicle 200 may remain there before experiencing a life threatening condition.

Figure 3:
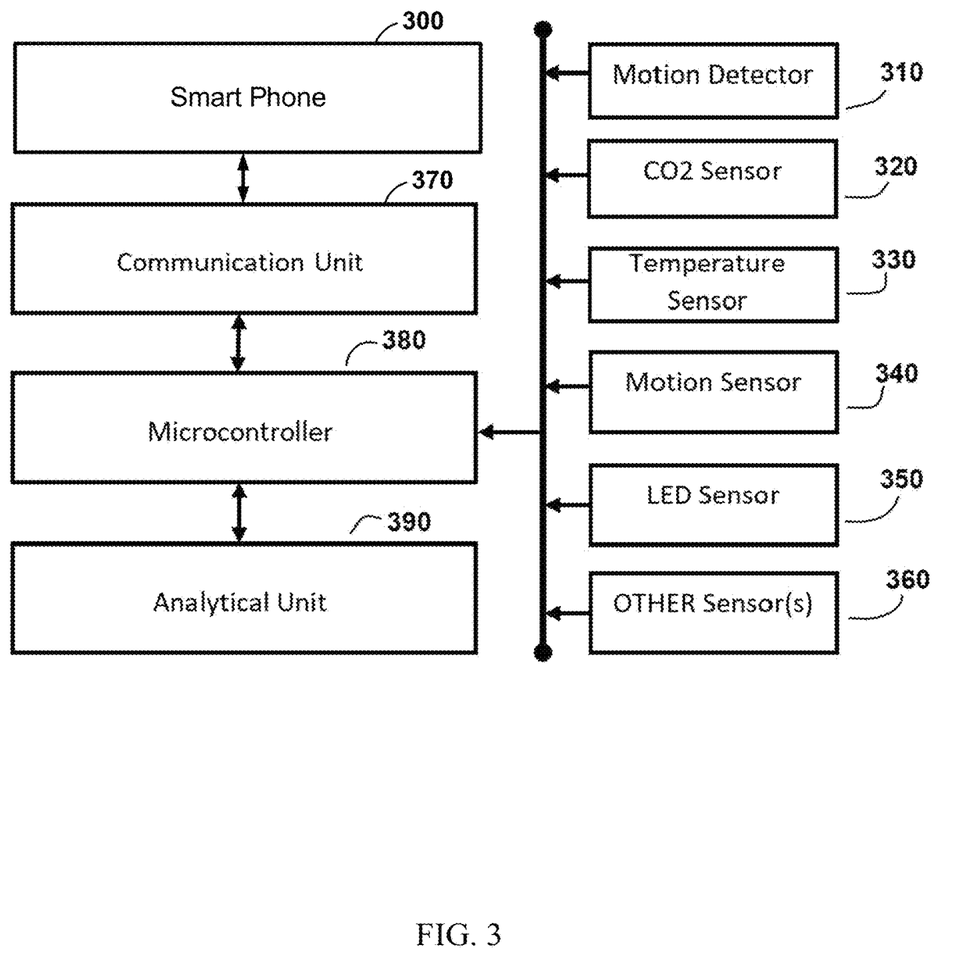
FIG. 3 is a flowchart of the present invention showing the units of an electronic communications device in which at least one of the embodiments of the present invention is shown.

FIG. 3 is a flowchart of the present invention showing the units of an electronic communications device in which at least one of the embodiments of the present invention is shown. The electronic communications device of the present invention may comprise a motion detector 310, a $CO_2$ sensor 320, a temperature sensor 330, at least one motion sensor 340, a LED sensor 350, and other sensor(s) 360. The at least one motion sensor 340 may be selected from the group consisting of an accelerometer, ultrasonic, optical, microwave, infrared, and video motion detectors that are capable of determining when the vehicle is moving or parked.

Outputs from these sensors are communicated to at least one microcontroller 380, and processed by an analytical unit 390. The forecasting results may then be transmitted to a smart phone 300 using a communication unit 370.

Figure 4:
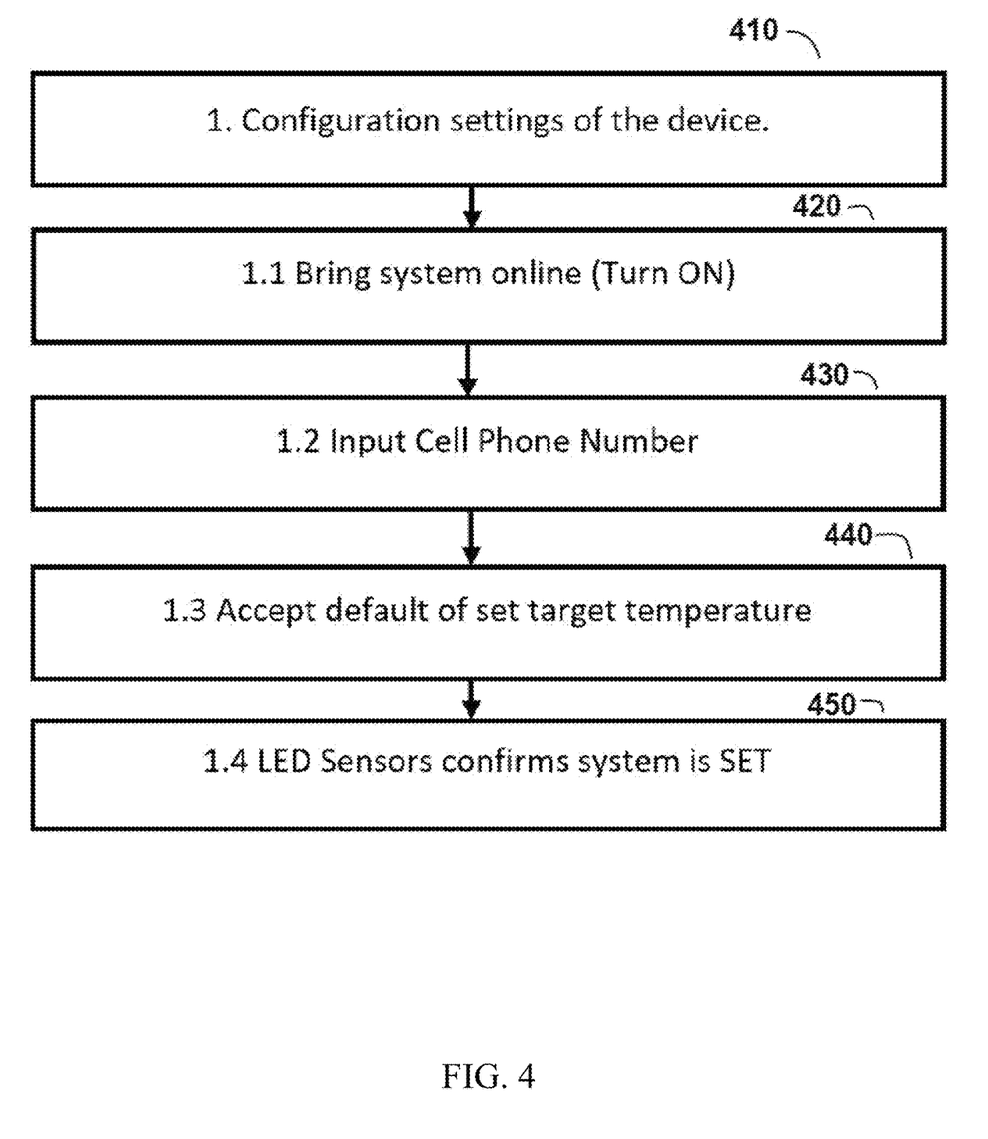
FIG. 4 is another flowchart of the present invention showing the configuration steps of the Early Warning Forecasting System in which at least one of the embodiments of the present invention is shown.

FIG. 4 is another flowchart of the present invention showing the configuration steps of the Early Warning Forecasting System in which at least one of the embodiments of the present invention is shown. In Step 1, "Configuration settings of the device" 410 describes the steps 1.1 to 1.4 to make system operable. In Step 1.1, to "Bring system online (Turn ON)" 420 means that the user moves the power switch from the OFF to ON position on the electronic communications device. In Step 1.2, "Input Cell Phone Number" 430 means that the user inputs a valid phone number into a mobile phone, where the owner of that inputted number will become a subscriber of the Early Warning Forecasting System. In many cases it may be the user's own phone number. In Step 1.3, "Accept default of set target temperature" 440 means that the user accepts the default threshold of the temperature. In Step 1.4, "LED sensors confirms system is SET" 450 means that a LED sensor blinks and shows solid green color or other color on the LED sensors.

Figure 5:
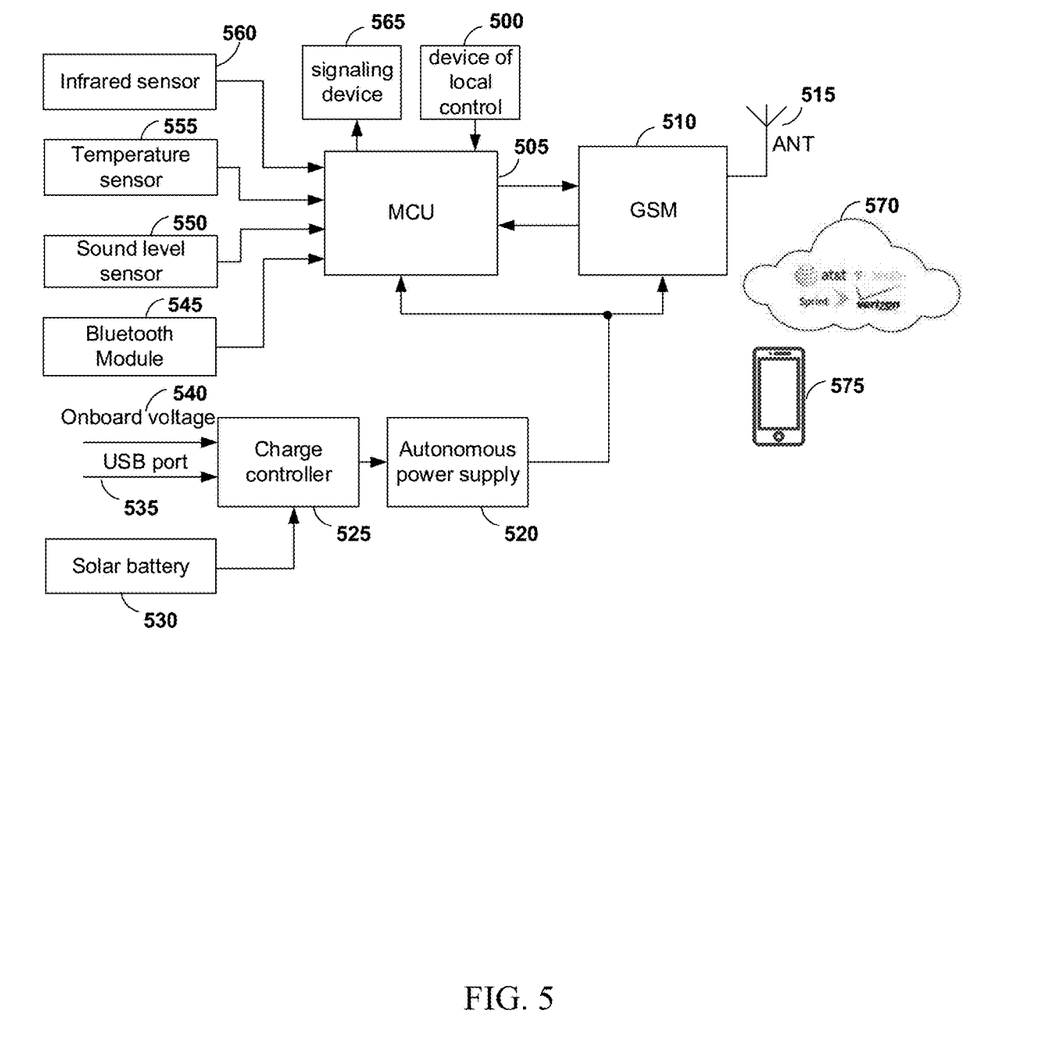
FIG. 5 is another flowchart of the present invention showing a simplified schema of the Early Warning Forecasting System in which at least one of the embodiments of the present invention is shown.

FIG. 5 is another flowchart of the present invention showing simplified schema of the Early Warning Forecasting System in which at least one of the embodiments of the present invention is shown. The device of the present invention may operate in accordance to the flowchart as shown in FIG. 5. This flowchart shows that the device comprises an infrared motion sensor 560, temperature sensor 555, sound level sensor 550, Bluetooth module 545, at least one specialized microcontroller unit (MCU) 505, a signaling device 565, local control device 500, a Global System for Mobile communication (GSM) module 510 with an antenna 515, a charge controller 525, an autonomous power supply 520, and a solar battery 530. Moreover, the output of an infrared sensor 560, the temperature sensor 555, the sound level sensor 550, and the Bluetooth module 545 are connected to the inputs of the MCU 505. Also, the input of the MCU 505 receives signals from the local control device 500, while the output of the MCU 505 is connected to the signaling device 565. The MCU 505 is connected to the GSM communication module 510 through bidirectional communication lines. The charge controller 525 is connected to the on-Board voltage of the vehicle 540 or to the USB port 535, or for uninterrupted power it is allowable to connect to the solar battery 530. The output of the charge controller 525 is connected to the input of an Autonomous power supply 520, while the output of the Autonomous power supply 520 is connected to the power inputs of both the MCU 505 and the GSM communication module 510. The antenna (ANT) 515 is also connected to the GSM communication module 510.

The device works by a temperature sensor 555 reading changes in the temperature inside of a vehicle at certain intervals. When the temperature in a passenger compartment of the vehicle is likely to reach a value that can be life-threatening to a child, an occupant with limited mobility, a pet or another living being, the MCU device 505 scans signals from an infrared motion sensor 560, sound level sensor 550 and Bluetooth module 545. If the Bluetooth module 545 does not detect a subscriber's phone within range, and the infrared motion sensor 560 or the sound level sensor 550 detects movement or sound in a passenger compartment of the vehicle, the MCU 505 makes a request for the GSM communication module 510, which will start sending a SMS with a preconfigured time interval to a subscriber's mobile phone 575 via cellular communication using an available communication provider 570. All registered trademarks used in component 570 of FIG. 5 are owned by others.

As shown in FIG. 5, setting the temperature limits, mobile phone number, and operating modes of the device is carried out through the mobile application on mobile phone 575. The device is powered by an autonomous power supply 520, which may be based on a disposable battery, or any rechargeable battery, such as a lithium-polymer battery that may be charged through the charge controller 525. The charge controller receives power from the USB port 535 or from the vehicle's on-board voltage 540 through a cigarette lighter, a solar battery 530, or other means. Also, information about the device's mode of operation, its status, or information sent to the subscriber about the upcoming life-threatening condition inside of a vehicle may be displayed on the front panel using a signaling device 565 performed in the form of a display, such as an LED display. The local control unit 500 may be presented in the form of an embedded keyboard, a few buttons, or both to manually set the operating mode or turn off the device. The same operations may be performed by provisioned mobile phone 575 as stated above.

Figure 6:
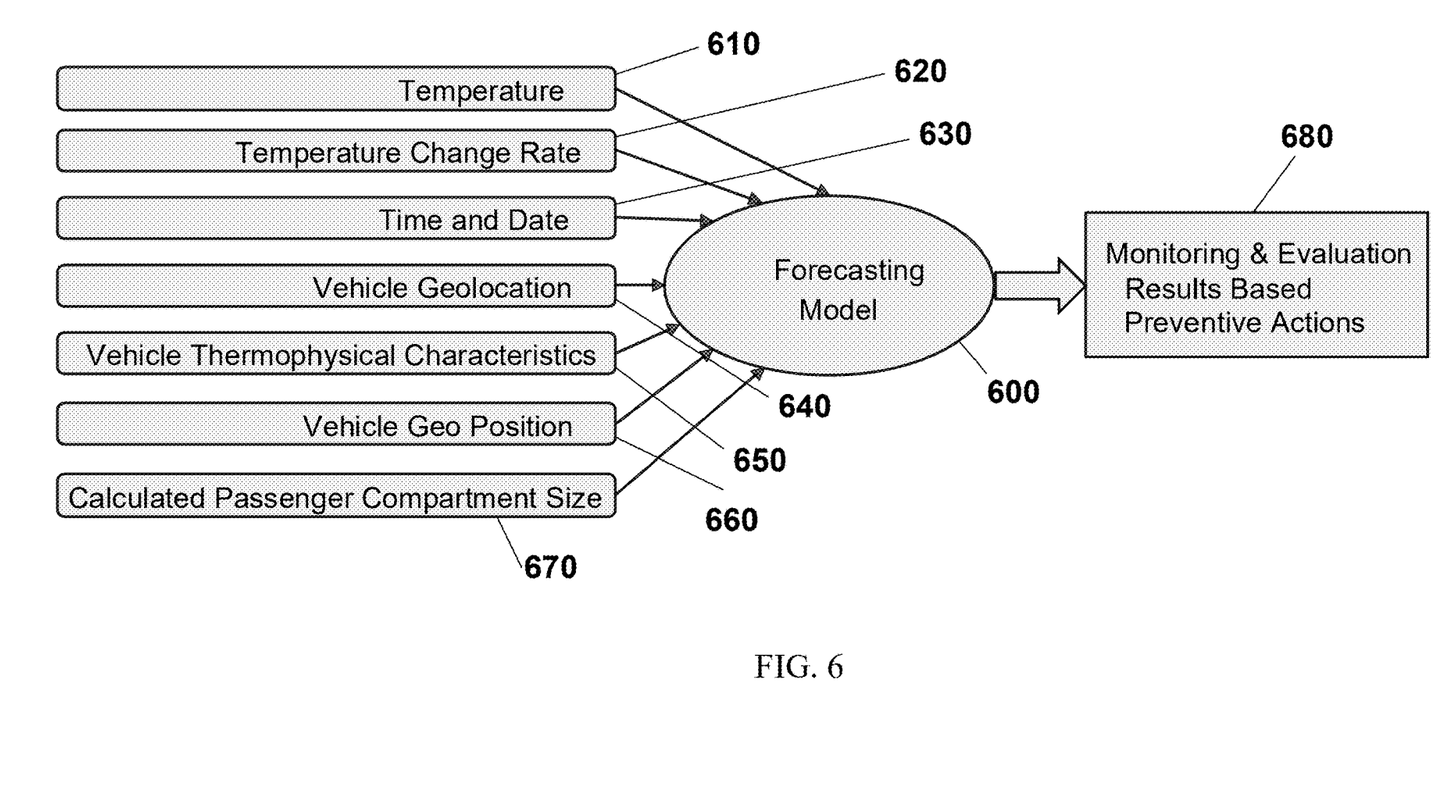
FIG. 6 is another flowchart of the present invention showing a forecasting model of the vehicle in which at least one of the embodiments of the present invention is shown.

FIG. 6 is another flowchart of the present invention showing forecasting model of the vehicle in which at least one of the embodiments of the present invention is shown. The model is design to forecast likelihood life-threatening temperature in a passenger compartment of a parked automotive vehicle. The forecasting model 600 constantly collects current temperature 610, the measurement of temperature change rate 620, obtaining information about the current time and date 630, the vehicle's geolocation 640, the thermophysical characteristics of the vehicle 650, the geo position of the vehicle 660, and the calculated passenger compartment size 670 and outputs it to a Monitoring & Evaluation Results Based Preventative Actions 680. The algorithm of the proposed device 600, shown in FIG. 6 makes it possible to forecast reaching the temperature in the interior of the vehicle at the threshold level, which is dangerous for the lives of people and animals. This approach allows you to create a warning about the danger at an earlier stage of development of overheating in the vehicle.

In mathematics, fuzzy sets (aka uncertain sets) are somewhat like sets whose elements have degrees of membership. By contrast, fuzzy set theory permits the gradual assessment of the membership of elements in a set. This is described with the aid of a membership function valued in the real unit interval [0, 1]. Mamdani fuzzy inference is the most commonly seen fuzzy methodology and was among the first control systems built using fuzzy set theory. Fuzzification may be defined as the process of transforming a crisp set to a fuzzy set or a fuzzy set to fuzzier set, while defuzzification may be defined as the process of reducing a fuzzy set into a crisp set or to convert a fuzzy member into a crisp member. In other words, there are many variables that constantly changing their values. Some values of those variables are linear, such as time, and some are not linear, such as temperature, sun position, etc. The algorithm described in this invention takes those numbers with a certain time interval and calculates changes of each parameter along with their dependencies on other parameters. For example, good analog could be the weather computers. They take the temperature changes, speed, and direction of the wind, along with changes of an atmosphere pressure and many other factors based on all those facts trying to predict upcoming weather for each targeted region for days and weeks ahead.

As shown in FIG. 6, the prediction model is implemented on a MCU 505 and is a system of fuzzy inference algorithm Mamdani, as the input parameters of the model are: temperature 610, temperature rise rate 620, local time 630, geographical coordinates of the vehicle 640, the position of the vehicle relative to the cardinal points 660, as the weight coefficients for expressions in the rule base in the fuzzy model, used thermo-physical characteristics of the vehicle 650 and the capacity of its interior 670. The output variable of the system is a coefficient that characterizes the degree of approximation of the temperature to the dangerous threshold. Alert is sent when the output function reaches a certain value.

Figure 7:
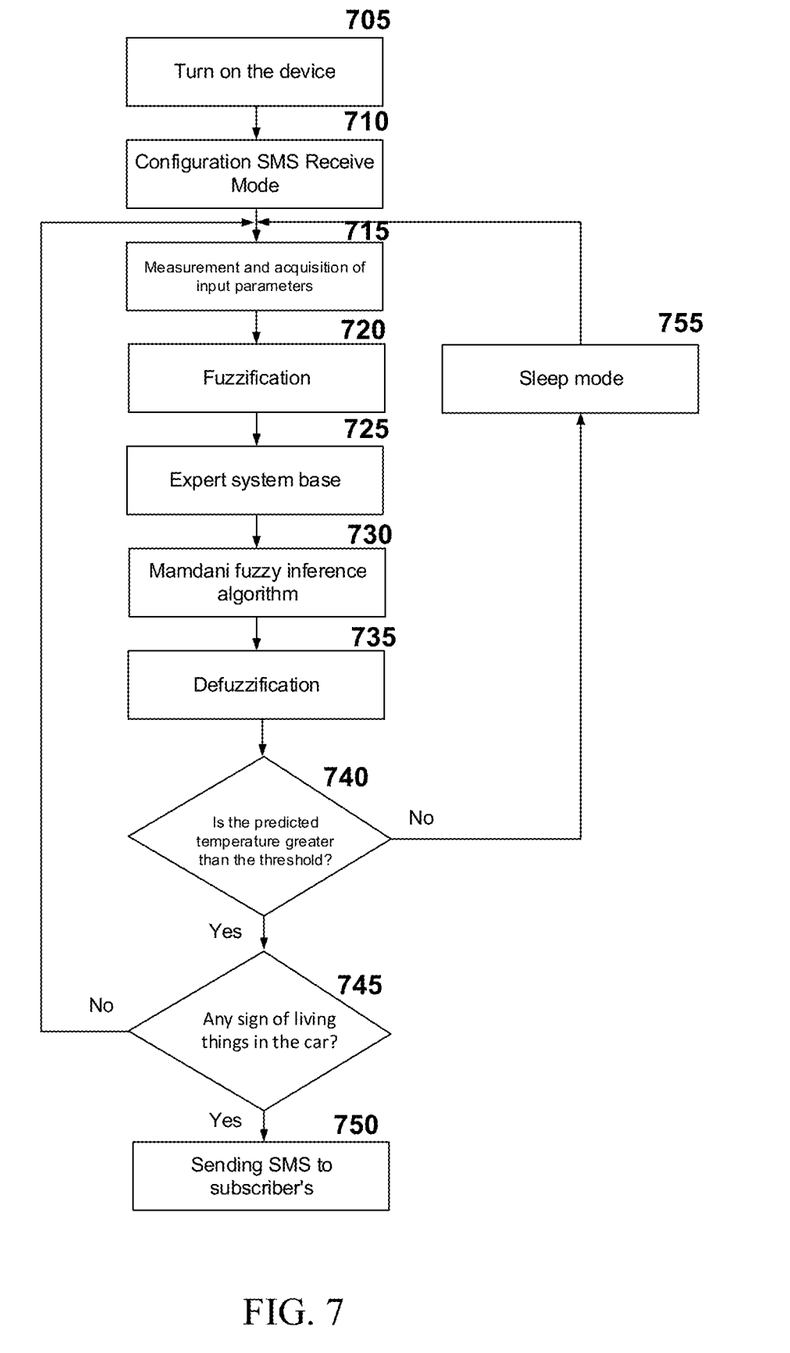
FIG. 7 is another flowchart of the present invention showing the steps of an algorithm of the device operation in which at least one of the embodiments of the present invention is shown.

As shown in FIG. 7, the functional algorithm of the temperature monitoring device is as follows:

Step 1: After the device is turned on 705, the connection with the mobile operator's network (Verizon, Sprint, AT&T, T-Mobile, etc.) 570 is established, as shown in FIG. 5. Upon successful connection, the device switches to the receive SMS configuration mode 710, in which the time interval is located. If a SMS with a device configuration comes at this time, new parameters will be written into the device's memory.

Step 2: Measurement of temperature, CO/CO2 level, obtaining information about the current time and date, coordinates and position of the vehicle.

Step 3: Calculation of the temperature prediction according to the prediction model for a given time interval.

Step 4: If the predicted temperature (or CO/CO2 level) does not exceed the dangerous temperature threshold, the device goes into sleep mode for the forecast time interval.

Step 5: After exiting sleep mode, items 2 and 3 are repeated.

Step 6: If the predicted temperature exceeds the dangerous temperature threshold, the device monitors the movement in the vehicle's salon, and measuring the sound level to determine the presence of living beings, if there is movement or sound more than a certain level, sending SMS to the subscriber number specified in the configuration.

Step 7: If the SMS is not sent due to the lack of a network, the sending is repeated with a specified cyclicality until successful completion.

FIG. 7 is another flowchart of the present invention showing the algorithm of the device operation in which at least one of the embodiments of the present invention is shown. After the device 705 is turned on, a connection is established with the network of the mobile operator, upon successful connection, the device switches to the Configuration SMS Receive Mode 710, in which the device is in a certain period of time. If SMS with a device configuration comes at this time, new parameters will be written into the device's memory.

In the functional unit 715, the presence of the driver is substantiated by the Bluetooth channel 545, the motion sensor 340, temperature sensor 555, sound level sensor 550, CO2 sensor 320, obtaining information about the current time and date 630, the coordinates 640 and position of the vehicle 660, etc., as shown in FIGS. 3, 5, and 6.

As shown in FIG. 7, through Fuzzification 720, Expert system base 725, Mamdani fuzzy interference algorithm 730 and Defuzzification 735; the prediction of the temperature 740 is calculated according to the forecasting model for a given time interval. It is known that the rate of heating of air in the vehicle depends on many factors from which it is possible to predict hazardous temperature indicators before their actual establishment. To build a model for predicting the dangerous temperature in the passenger compartment of the vehicle, the fuzzy inference device for the Mamdani algorithm is used.

As shown in FIG. 6, the input values by which one can judge about the appearance of a dangerous temperature are selected, which may include the temperature in the passenger compartment 610, temperature rise rate 620, local time 630, geographical coordinates 640, vehicle thermophysical characteristics 650, vehicle position relative to the cardinal points 660, and the passenger compartment capacity 670.

As shown in FIG. 7, the fuzzification of input values 720 according to certain terms, produced using the Gaussian membership function, also for the functioning of a mathematical model of fuzzy inference, a knowledge base of fuzzy rules was formed based on expert estimates 725 obtained from the results of the experimental data.

It should be noted that the weights of the rules are not included in the equation for determining the output parameter, since for coarse adjustment they are assumed to be equal to one. By having measured input values, as shown in FIG. 6, comprising the temperature in the passenger compartment 610, temperature rise rate 620, local time 630, geographical coordinates 640, vehicle thermophysical characteristics 650, vehicle position relative to the cardinal points 660, and the passenger compartment capacity 670; as shown in FIG. 7, the model in block 730 which, after the operation of defuzzification 735, using the center of gravity method, we obtain the value of the coefficient of danger of exceeding the temperature regime.

In unit 740, the predicted temperature is compared with the threshold value. If the predicted temperature does not exceed the dangerous temperature threshold, the device goes into sleep mode 755 for the forecast time interval. After exiting the sleep mode, the actions of units 720 and 730 are repeated. If the predicted temperature exceeds the dangerous temperature threshold, the device in unit 745 checks for movement inside the vehicle, measuring the sound level and CO2 concentration, in order to determine the presence of living beings. In unit 750, if there is movement, sound, or a change in CO2 concentration above a certain level, an SMS is sent to the subscriber number specified in the configuration. If the SMS is not sent due to the lack of a network, the sending is repeated with a specified time interval until successful completion.

Figure 8:
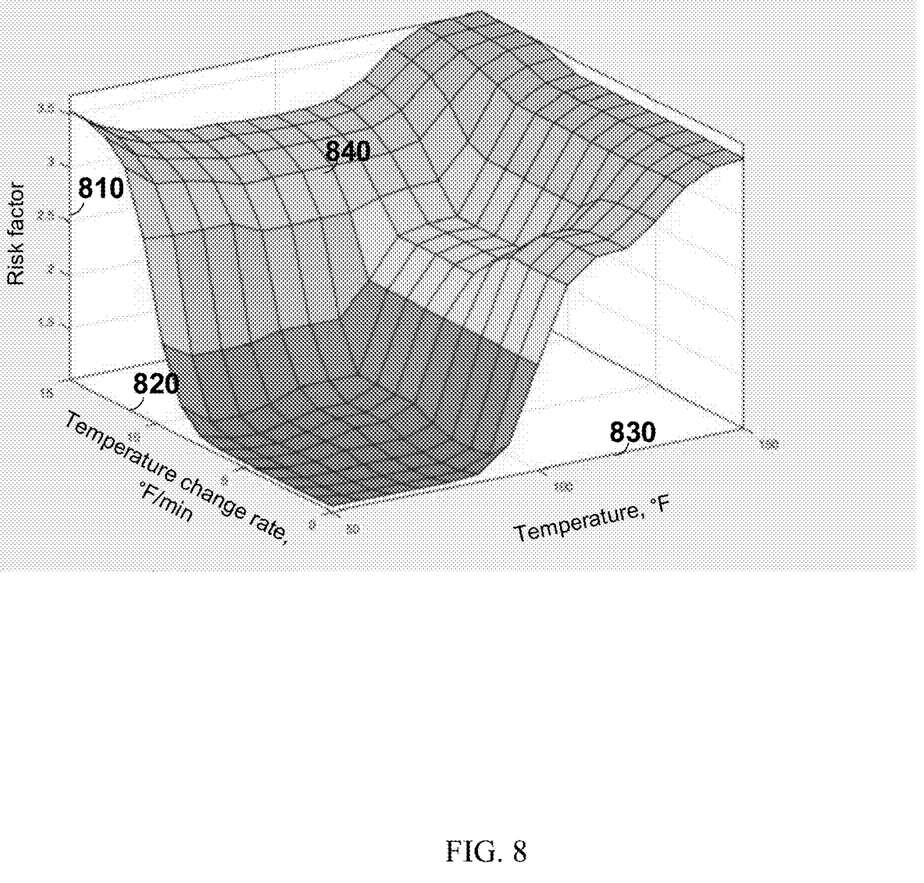
FIG. 8 is another flowchart of the present invention showing the surface of the fuzzy output and describes the relative change in the hazard ratio of exceeding the temperature, depending on the temperature in the vehicle and the rate of temperature change in which at least one of the embodiments of the present invention is shown.

FIG. 8 is another flowchart of the present invention showing the surface of the fuzzy output and describes the relative change in the risk factor of exceeding the temperature, depending on the temperature in the vehicle and the rate of temperature change in which at least one of the embodiments of the present invention is shown. The resulting surface 840 is a graphical representation (image) of the output function of a fuzzy inference, which predicts the degree of risk that a dangerous temperature will appear in the vehicle. The surface of the fuzzy output 840 shown in FIG. 8 describes the relative change in the risk factor of exceeding the temperature 810, depending on the temperature in the vehicle 830 and the rate of temperature change 820.

Although the invention has been explained in relation to its preferred embodiment, it is to be understood that many other possible modifications and variations may be made without departing from the spirit and scope of the invention. All illustrations of the drawings are for the purpose of describing selected versions of the present invention and are not intended to limit the scope of the present invention.

All of these embodiments and the invention disclosed herein are intended to be within the scope herein disclosed. These and other embodiments of the invention will become readily apparent to those skilled in the art from the detailed description of the preferred embodiments having reference to the attached figures, the embodiments not being limited to any particular, preferred embodiments disclosed. Also, the invention disclosed herein suitably may be practiced in the absence of any element which is not specifically disclosed herein.

While certain embodiments have been shown and described, it will be understood that there is no intent to limit the invention by such disclosure, but rather, is intended to cover all modifications and alternate constructions falling within the spirit and scope of the invention as defined in the appended claims.

Although the invention has been explained in relation to its preferred embodiment, it is to be understood that many other possible modifications and variations may be made without departing from the spirit and scope of the invention.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The method comprises receiving data from a specialized communication device, over a cellular, wireless, satellite, or other network to a special purpose computer with a non-transitory computer readable medium. In one or more of the embodiments, the functions described herein may be implemented in any combination of hardware, software, firmware, etc. The functions may be stored or transmitted as one or more software instructions, computer-executable instructions, or processor-executable instructions, or code on a tangible non-transitory computer readable medium or on a non-transitory processor-readable storage medium, if implemented in software.

The steps of an algorithm, process, or method disclosed herein may be embodied in a processor-executable software module that may reside on a non-transitory computer readable medium. Non-transitory computer readable medium readable media comprises computer storage media and communication media including any medium that facilitates transfer of a computer program from one place to another. A non-transitory storage media may be any available media that may be accessed by the special purpose host computer system.

Computer-readable media include both computer storage media and communication media including any medium that facilitates transfer of a computer program from one place to another. A storage media may be any available media that can be accessed by a computer. By way of example, and not limitation, such computer-readable media can comprise EEPROM or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. The term memory may include volatile or non-volatile memory.

Also, combinations of the above should be included within the scope of non-transitory computer readable medium. In addition, the operations of an algorithm, process, or method may reside as one or any combination or codes, set of codes, instructions, or sets of instructions on a non-transitory machine readable medium or an a non-transitory computer readable medium, which may be incorporated into a computer program product. All illustrations of the drawings are for the purpose of describing selected versions of the present invention and are not intended to limit the scope of the present invention.

The foregoing summary, as well as the following detailed description of various embodiments, is better understood when read in conjunction with the appended drawings. For the purposes of illustration, there is shown in the drawing's exemplary embodiments; however, the presently disclosed subject matter is not limited to the specific methods and instrumentalities disclosed.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

What is claimed is:

1. A method to gathering multiple data factors and using an algorithm to determine if a certain temperature is life threatening to vehicle occupants, comprising the steps of;
    receiving data values regarding interior aspects of a vehicle comprising the shape and size of the vehicle's interior, the amount of tint on the windows, and the interior color of the vehicle;
    receiving data values regarding exterior aspects of the vehicle comprising its GPS coordinates, the size of the vehicle, the exterior color of the vehicle, and whether the vehicle is parked in direct sunlight or shade;
    receiving data values regarding the conditions at the location of the vehicle comprising the amount of sunlight, the humidity, elevation, wind velocity, and GPS coordinates;
    evaluating the data values regarding interior aspects of the vehicle, the data values regarding exterior aspects of the vehicle, and the data values regarding the conditions at the location of the vehicle with at least one processor through a regression algorithm stored on a nontransitory computer readable medium to determine if the temperature reaches a particular threshold;
    transmitting with an electronic communications device comprising a telephone call, SMS, text, or warning message regarding the temperature to emergency respondents, 911 or another person;
    measuring gaseous levels from sensors selected from the group consisting of carbon dioxide ("CO2"), carbon monoxide ("CO"), and oxygen ("O2"); and
    transmitting a signal to turn off the vehicle's ignition when either the CO or CO2 levels increase to a dangerous level when a GPS sensor determines the vehicle is parked in a closed space or a garage.

2. The method of claim 1, further comprising transmitting a signal to open a garage door when the GPS sensor determines the vehicle is parked in a closed space or a garage.

3. The method of claim 1, further comprising sending a SMS to telephone numbers of multiple subscribers.

4. The method of claim 1, further comprising predicting unsafe temperature using the methods of fuzzy logic that forms a regression function that measures the relationship between values of current weather, weather forecast, temperature in a passenger compartment of a vehicle, geographical location of the vehicle and interior and exterior features of the vehicle comprising color, size, and window tinting.

5. The method of claim 1, further comprising exchanging information with other devices over communication protocols and adjust coefficients of a regression function over time.

6. The method of claim 1, further comprising predicting dangerous situations before they will actually occur through the use of a regression function.

7. The method of claim 1, further comprising automatically turning on when a vehicle is parked and, the presence of living organisms is detected.

8. The method of claim 1, further comprising using a weather forecast to estimate a vehicle's temperature.

9. The method of claim 1, further comprising taking into account a geographical location of a vehicle to consider the effect of altitude, wind, and nearby bodies of water that may provide cooling.

10. The method of claim 1, further comprising analyzing additional factors based on previously collected data for same vehicle models.

* * * * *